UNITED STATES PATENT OFFICE.

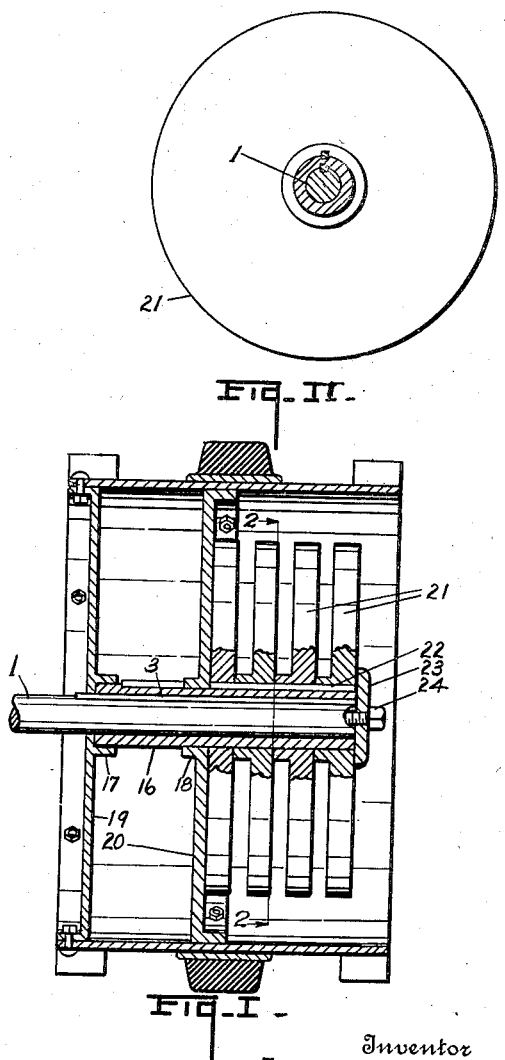

EDMUND E. HANS, OF DETROIT, MICHIGAN.

TRACTION-WHEEL.

1,380,474.　　　　Specification of Letters Patent.　　Patented June 7, 1921.

Application filed November 26, 1919. Serial No. 340,825.

*To all whom it may concern:*

Be it known that I, EDMUND E. HANS, a citizen of the United States, residing at the city of Detroit, county of Wayne, State of Michigan, have invented certain new and useful Improvements in Traction-Wheels, of which the following is a specification.

This invention relates to improvements in traction wheels.

The main object of this invention is to provide an improved traction wheel which may be weighted to secure the desired traction under varied conditions of load to be hauled and of road or surface traveled over.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a vertical central section of a structure embodying the features of my invention, the axle being shown in full lines and partially broken away.

Fig. II is a detail section on a line corresponding to line 2—2 of Fig. I.

In the drawing similar reference characters refer to similar parts in both views and the sectional view is taken looking in the direction of the little arrows at the ends of the section line.

Referring to the drawing, 1 represents a driving axle, to which the tubular hub 16 is secured by the key or spline 3. The webs or spoke members 19 and 20 are provided with flanges 17 and 18 respectively which engage the hub 16. The spoke member 20 is arranged in a spaced relation to the outer end of the rim and hub so that the hub projects to receive the weighing disks 21. These disks are housed within or by the rim and prevented from rotating on the hub by the key or spline 22 and are detachably retained thereon by the plate 23 and the screw 24. This arrangement enables a practical variation of the weight of the wheel to meet the varying conditions in use.

Having thus described my invention, what I claim as new and desire to secure by Letters Patent is:

1. In a traction wheel, the combination with an axle, of a hub keyed to said axle, a rim, spoke members connecting said hub and rim, the outer spoke member being arranged in a spaced relation relative to the outer ends of the hub and rim, and circular weighting disks keyed upon said hub at the outer side of its outer web, said disks being removable to permit a variation in the number or the substitution of others to vary the weight.

2. In a traction wheel, the combination of a rim, a hub, spoke members disposed so that the hub projects beyond the spoke members, and weighting disks keyed upon said hub at the outer side of its outer spoke member.

3. In a traction wheel, the combination of a rim, a hub, spoke members disposed so that the hub projects beyond the spoke members, and weight members removably mounted on the projecting end of said hub.

4. In a traction wheel, the combination of a rim, a hub, spoke members disposed so that the hub projects beyond the spoke members, and a weight member mounted on the projecting end of said hub.

5. In a traction wheel, the combination of a rim, a hub, spoke members disposed so that the hub projects beyond the spoke members, and a weight member removably mounted on the hub on the outer side of the outer spoke member and embraced by said rim.

In witness whereof, I have hereunto set my hand and seal in the presence of two witnesses.

EDMUND E. HANS. [L. S.]

Witnesses:
　　CARRIE C. SCHWARTZEL,
　　WALTER I. OESCHGER.